3,449,420
γ-RESORCYLIC ACID ANILIDES AND PROCESS
FOR PREPARING THEM
Heinrich Ruschig, Bad Soden, Taunus, Johann König,
Niederhofheim, Taunus, and Dieter Düwel, Hofheim,
Taunus, Germany, assignors to Farbwerke Hoechst Aktiengesellschaft vormals Meister Lucius & Bruning,
Frankfurt am Main, Germany, a corporation of
Germany
No Drawing. Filed Dec. 20, 1966, Ser. No. 603,111
Claims priority, application Germany, Jan. 15, 1966,
F 48,175
Int. Cl. A61k 27/00; C07c 103/26, 103/30
U.S. Cl. 260—559   8 Claims

ABSTRACT OF THE DISCLOSURE

γ-Resorcylic acid anilides, having anthelmintic activity, which correspond to the general formula

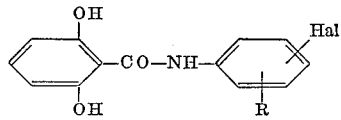

wherein Hal represents a halogen atom and R represents hydrogen, a halogen atom or a low molecular weight alkyl group.

---

γ-Resorcylic acid anilides (2,6-dihydroxy-benzoic acid anilides) are already known from "Journal of Scientific and Industrial Research of India" 11 B, 292 (1952).

It has now been found that, surprisingly enough, γ-resorcylic acid anilides of valuable highly therapeutical properties and corresponding to the general formula

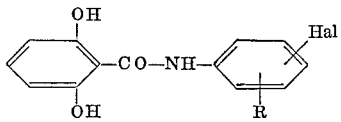 (I)

wherein Hal represents a halogen atom and R represents a hydrogen or halogen atom or a low-molecular alkyl group, can be obtained by (a) reacting γ-resorcylic acid or reactive functional derivatives thereof with aniline derivatives of the general Formula II

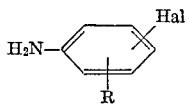 (II)

or (b) treating compounds of the general Formula III

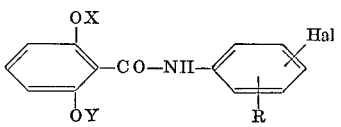 (III)

wherein X and Y represent low-molecular alkyl groups, aralkyl or acyl groups, with ether-dissociating agents and/or hydrolysing them.

As starting materials to be used in the method described under (a), there enter into consideration according to the present invention anilines, the benzene nucleus of which carries at least one halogen atom. Halogen atoms may be all the halogens, particularly preferred, however, are chlorine and bromine. As starting materials there may be used halogen-anilines mono- or disubstituted in any position possible, and alkyl-halogen-anilines disubstituted in 2,6-, 2,5-, 2,4- or 2,3-position.

The process of the invention, described sub(a), is carried out for example, by reacting γ-resorcylic acid with an aniline derivative in the presence of an appropriate condensation agent. It is advantageous to operate in an inert solvent, such, for example, as aromatic hydrocarbons, for example benzene, toluene, xylene or ethers, for example diethyl ether or diisopropyl ether. As condensation agents there are preferably used phosphor halides. Particularly appropriate is phosphor-trichloride or phosphoroxy-chloride. In order to accelerate the reaction, it is sutiable to carry out the reaction at elevated temperatures, advantageously at the boiling temperature of the solvent used. In general the reaction is complete after a few hours. For the isolation of the γ-resorcylic acid anilide formed the reaction mixture is treated with water, eventually after distillation of the solvent, and the insoluble product is filtered off.

In many cases it is of advantage to react instead of the free γ-resorcylic acid one of its functional reactive derivatives with an aniline. Appropriate for this reaction are, for example, acid halides, acid anhydrides or acid esters.

The reaction of aromatic esters, for example phenyl ester, with aniline proceeds in a particularly smooth manner. In this case the reaction components are mixed with each other and heated for a short period of time to elevated temperatures, preferably to 160–200° C. After cooling, the solid reaction product is triturated suitably with an inert solvent and the anilide may be isolated by filtration. The reaction of aromatic γ-resorcylic acid esters with anilines can also be effected advantageously in the presence of inert solvents boiling at high temperatures. Appropriate for this reaction are aromatic hydrocarbons or hydrocarbon halides such as xylene, tetraline, trichlorobenzene etc.

Mixed inner anhydrides which may be used as reactive derivatives of γ-resorcylic acid for the acylation of the anilines, are for example 2-chloro-5-hydroxy-4H-1,3,2-dioxaphosphorin-4-one of the Formula IV and 5-hydroxy-[1,3]-benzodioxane-2,4-dione of the Formula V

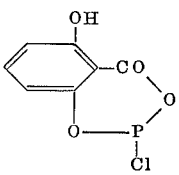 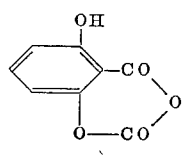
IV                      V

Said anhydrides form upon reaction of phosphor trichloride or phosgene with γ-resorcylic acid. The reaction with an aniline is advantageously carried out in the presence of an inert solvent, such as, for example, benzene, toluene, dioxane, dibutyl ether etc., by heating the reaction mixture to elevated temperatures, preferably to the boiling temperature of the solvent. On completion of the reaction the whole is treated with water and the aniline is isolated according to known methods.

According to the method of operation described under (b), the products of the process can also be prepared by splitting off from compounds of the general Formula III, wherein the hydroxyl groups of resorcylic acid are protected by low alkyl groups, aralkyl or acyl radicals, said protective groups by treatment with ether-dissociating agents or by hydrolysis.

These protected resorcyl anilides of the Formula III can be prepared, for example, according to the method described above, by starting from the conveniently substituted resorcyclic acid derivatives. This method of operation is particularly appropriate when using as resorcylic acid derivatives the highly reactive acid halides. Suitable protective groups may be, for example, low molecular alkyl groups, such as the methyl or ethyl group or aralkyl radicals, for example the benzyl radical. Protective groups may also be low molecular acyl radicals, for example the acetyl or propionyl radical, as well as aromatic acyl radicals, such as the benzoyl radical or the carbomethoxy radical.

The acid derivatives protected in this manner may be reacted with the aniline derivatives according to the method described above, to form the compounds of Formula III.

It is also possible to react the resorcylic acid derivatives protected at the OH-group, with isocyanates or isothiocyanates of the general Formula VI or VII

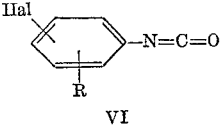 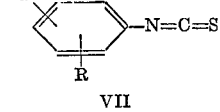

VI  VII wherein Hal represents a halogen atom and R represents a hydrogen or halogen atom or a lower alkyl group. The reaction is advantageously carried out at temperatures ranging from 80 to 160° C., in inert solvents, whereupon the corresponding anilides of the Formula III are formed with simultaneous separation of $CO_2$ or COS.

The protective groups are split off by known methods applied according to the nature of said groups. Acyl radicals can be eliminated by hydrolysis, for example by a treatment with dilute alkaline agents, the alkyl groups, for instance, can be split off by heating with hydrobromic or hydroiodic acid or other ether-dissociating agents, such as aluminum chloride or aluminum bromide. Aralkyl groups can be split off by means of hydrobromic or hydroiodic acid or by catalytical hydrogenation.

The substances obtained according to the process of the present invention are crystalline colorless bodies only sparingly soluble in water. By recrystallisation from suitable solvents they can in general be purified easily.

The novel anilides of γ-resorcylic acid are distinguished by a marked anthelmintic action which is effective particularly against tapeworms and exceeds that of the anti-tapeworm preparation 5-chlorosalicyclic acid-2'-chloro-4'-nitro-anilide used up to now in practice. The superiority of the new compounds can be detected from the following Table I which compiles the results of experimental chemotherapeutical tests with some of the products of the present process and compares them with those of 5-chlorosalicyclic acid-2'-chloro-4'-nitro-anilide. The tests were made with rats who were experimentally infected with tapeworms for testing purposes, the compounds to be tested being administered in tylose suspension to the animals once per os. The infection of the rats was provoked by 5 cysticercoids of *Hymenolepis diminuta* respectively, obtained from *Tribolium confusum*. At the end of the pre-patency period the infection was controlled by examination of the feces. The success of the treatment showed on the third and fifth day upon repeated examination of the feces and on the seventh day after the treatment upon dissection of the animals. Dosis curativa minima is the dose required for expelling the worms.

TABLE I.—CHEMOTHERAPEUTICAL EXAMINATIONS (HOST ANIMAL: RAT; PARASITE: *HYMENOLEPIS DIMINUTA*)

| Substance: | Dos. cur. min. (mg./kg. of body weight) |
|---|---|
| 2,6-dihydroxybenzoic-acid-4'-chloranilide | 25 |
| 2,6-dihydroxybenzoic-acid-4'-bromanilide | 16 |
| 2,6-dihydroxybenzoic-acid-3'-chloranilide | 50 |
| 2,6-dihydroxybenzoic-acid-2',4'-dichloranilide | 20 |
| 2,6-dihydroxybenzoic-acid-2'-methyl-4'-chloranilide | 10 |
| 5-chlorosalicyclic-acid-2'-chloro-4'-nitro-anilide | 50 |

In contradistinction to 5-chlorosalicyclic-acid-2'-chloro-4'-nitroanilide known as anti-tapeworm preparation the anthelmintic action of the products of the present process extends also to other intestinal parasites, for example to threadworms. Table II lists the result of tests with mice who had been infected experimentally with 200 eggs of *Aspiculuris tetraptera* respectively. The substances to be tested were administered in a tylose suspension to the animals 3 times per os. The result of the treatments became evident by examination of the feces at the end of the pre-patency period, on the third and fifth day and by dissection of the animals on the seventh day after the treatment. Dosis curativa minima is the dose which, after being applied 3 times, had expelled the worms completely.

TABLE II.—CHEMOTHERAPEUTICAL EXAMINATIONS (HOST ANIMAL: MOUSE; PARASITE: *ASPISCULURIS TETRAPTERA*)

| Substance: | Dos. cur. min. (mg./kg. of body weight) |
|---|---|
| 2,6-dihydroxybenzoic-acid-4'-chloranilide | 3×125 |
| 2,6-dihydroxybenzoic-acid-3'-chloranilide | 3×250 |
| 2,6-dihydroxybenzoic-acid-4'-bromanilide | 3×400 |
| 2,6-dihydroxybenzoic-acid-2'-methyl-4'-chloranilide | 3×200 |
| 5-chlorosalicyclic-acid-2'-chloro-4'-nitro-anilide | Ineffective |

The cited values show the importance of the products of the present process as valuable medicaments. In the first place they are appropriate for combating tapeworms in human beings and in domestic or useful animals. Moreover, they can also be administered with success as therapeutics against mixed infections caused by several intestinal parasites.

The γ-resorcyclic acid anilides known from "Journal of Scientific and Industrial Research of India" 11 B, 292 (1952), which, in contradistinction to the products of the present process, do not carry any halogen substituent, did not exhibit any anthelmintic action in the examinations described above. In the human medicin the products of the present process are administered mainly per os, in the form of tablets, dragées or capsules, As pharmaceutical carriers there are used the known carriers, such as lactose, starch, traganth, magnesium stearate. If the products of the process are used in the form of capsules, they may also be administered without the addition of carriers. In the human medicine the appropriate dose is approximately 0.5–3 g. per day, in the veterinary medicine for example once to twice a day 50 to 200 mg./kg. are administered to the dog or 30 to 150 mg./kg. are administered to the sheep. In the veterinary medicine the products of the process are administered suitably in the form of suspended powders added to the drinking liquid.

The following examples serve to illustrate the invention but they are not intended to limit it thereto.

Example 1.—2,6-dihydroxybenzoic-acid-4'-fluoranilide 35 grams of 2,6-dihydroxybenzoic acid phenylester and 18 grams of 4-fluoraniline are jointly heated for 5 minutes to 195° C., then cooled to approximately 20° C., the crystalline mass is triturated with 40 ml. of benzene, the crystals are sucked off and washed with 80 ml. of ethanol. 36 grams of 2,6-dihydroxybenzoic-acid-4'-fluoranilide are obtained, melting at 224–225° C.

The 2,6-dihydroxybenzoic acid phenylester (melting point 96–97° C.) can be prepared from 2,6-dihydroxybenzoic acid and phenol by reaction of phosphoroxy chloride.

Example 2.—2,6-dihydroxybenzoic-acid-4'-chloranilide 92 grams of 2,6-dihydroxybenzoic acid phenylester and 60 grams of 4-chloraniline are jointly heated for 10 minutes to 180° C., cooled to approximately 20° C., the crystalline mass is triturated with 80 ml. of benzene, the crystals are sucked off and washed with 60 ml. of benzene and 80 ml. of ethanol. 101 grams of 2,6-dihydroxybenzoic-acid-4'-chlor-anilide are obtained, melting at 223–225° C.

Example 3.—2,6-dihydroxybenzoic-acid-4'-bromanilide 69 grams of 2,6-dihydroxybenzoic acid phenylester and 62 grams of 4-bromaniline are jointly heated for 10 minutes to 190° C. The whole is then cooled to approximately 20° C., the crystalline mass is triturated with 60 ml. of benzene, the crystals are sucked off and washed with 40 ml. of benzene and 100 ml. of ethanol. 84 grams of 2,6-dihydroxybenzoic-acid-4'-bromanilide are obtained, melting at 229–230° C.

In analogous manner thereto the following compounds are obtained with similar good yields:

| Example | | Melting point, ° C. |
|---|---|---|
| 4 | 2,6-dihydroxybenzoic-acid-2'-chloranilide | 246–247 |
| 5 | 2,6-dihydroxybenzoic-acid-3'-chloranilide | 226–228 |
| 6 | 2,6-dihydroxybenzoic-acid-2',4'-dichloranilide | 240–241 |
| 7 | 2,6-dihydroxybenzoic-acid-2',5'-dichloranilide | 268–269 |
| 8 | 2,6-dihydroxybenzoic-acid-2'-methyl-4'-chloranilide | 209–211 |

Example 9.—2,6-dihydroxybenzoic-acid-2',4'-dichloranilide 105 grams of 2,6-dihydroxybenzoic acid phenylester, 75 grams of 2,4-dichloraniline and 90 ml. of 1,2,4-trichlorobenzene are jointly heated for 10 minutes to 195° C. After cooling the crystals which have separated are sucked off, washed with 100 ml. of ethanol and recrystallised from tetrahydrofurane. 68 grams of 2,6-dihydroxybenzoic-acid-2',4'-dichloranilide are obtained, melting at 241–242° C.

Example 10

In analogous manner thereto 2,6-dihydroxybenzoic-acid-3',4'-dichloranilide is obtained, which melts at 267–268° C.

Example 11.—2,6-dihydroxybenzoic-acid-2'-methyl-6'-chloranilide 35 grams of 2,6-dihydroxybenzoic acid phenylester, 22 grams of 2-amino-3-chlorotoluene and 35 ml. of tetraline are jointly heated for 15 minutes to 190° C. After cooling 85 ml. of petroleum ether (boiling point 40–80° C.) are added, the separated crystals are sucked off and recrystallised from ethanol. 20 grams of 2,6-dihydroxybenzoic-acid-2'-methyl-6'-chloranilide are obtained, melting at 194–196° C.

Example 12.—2,6-dihydroxybenzoic-acid-3',4'-dichloranilide 15.4 grams of 2,6-dihydroxybenzoic acid, 33 grams of 3,4-dichloraniline, 450 ml. of dry toluene and 15.7 grams of phosphor trichloride are jointly heated under reflux for 7 hours, while stirring. The toluene is then distilled off in vacuo, the residue is boiled 4 times with 300 ml. of water respectively, each time the undissolved raw product being filtered with suction. For purification purposes the whole is recrystallised from dioxane. 16.8 grams of 2,6-dihydroxybenzoic-acid-3',4'-dichloranilide are obtained, melting at 267° C.

Example 13.—2,6-dihydroxybenzoic-acid-4'-iodanilide 21 grams of 2-chloro-5-hydroxy-4H-1,3,2-dioxyphosphorin-4-one, 42 grams of 4-iodaniline and 150 ml. of dry benzene are jointly heated for one hour under reflux. Benzene is distilled off in vacuo, the residue is heated for 30 minutes in 250 ml. of water, the undissolved product is filtered off and washed three times with 150 ml. of hot water respectively. For purification purposes the whole is twice recrystallised from glacial acetic acid. 15 grams of 2,6-dihydroxybenzoic-acid - 4' - iodanilide are obtained, melting at 226° C. (with decomposition).

(2-chloro - 5 - hydroxy-4H-1,3,2-dioxaphosphorin-4-one can be prepared from 2,6-dihydroxybenzoic acid and phosphortrichloride. It constitutes a colorless oil which is soluble in petroleum ether and can be reacted with water to form 2,6-dihydroxybenzoic acid.)

Example 14.—2,6-dihydroxybenzoic-acid-3',4'-dichloranilide (a) 13 grams of 3,4-dichloraniline and 11 grams of triethylamine are dissolved in 65 ml. of dry tetrahydrofurane. To this solution a solution of 16.1 grams of 2,6-dimethoxybenzoyl chloride in 45 ml. of dry tetrahydrofurane is added dropwise within 5 minutes, while stirring and cooling (5° C.). Stirring is continued for one hour, tetrahydrofurane is distilled off, the residue is triturated with 150 ml. of water, the crystals are filtered with suction, triturated one after the other with 150 ml. of 2 N HCl and 2 N NaOH, each time the whole is filtered with suction and washed with 40 ml. of water. The raw product is recrystallised from methanol. 17.5 grams of 2,6-dimethoxybenzoic-acid-3',4'-dichloranilide are obtained, melting at 181–183° C.

(b) 1.5 grams of 2,6-dimethoxybenzoic-acid-3',4'-dichloranilide and 8 ml. of hydroiodic acid of 57% strength are jointly heated under reflux for 40 minutes. Then the whole is cooled, diluted with 30 ml. of water, the crystals are filtered with suction, washed with 15 ml. of water and recrystallised from dioxane. 1.1 grams of 2,6-dihydroxybenzoic-acid-3',4'-dichloranilide is obtained, melting at 267° C.

Example 15.—2,6-dihydroxybenzoic-acid-4'-chloranilide (a) 3.1 grams of 2,6-dimethoxybenzoic acid and 2.7 grams of 4-chlorophenylisocyanate are jointly heated in 15 ml. of 1,2-dichlorobenzene for 4 hours to 160° C. The hot solution is filtered, evaporated in vacuo, the residue is triturated with 15 ml. of NaOH, the solid product is filtered with suction, washed with 15 ml. of water and twice recrystallised from methanol. 2.0 grams of 2,6-dimethoxybenzoic-acid-4'-chloranilide are obtained, melting at 210–211° C.

(b) 1.8 grams of 2,6-dimethoxybenzoic-acid-4'-chloranilide are heated under reflux for 40 minutes together with 10 ml. of hydroiodic acid of 57% strength. Then the whole is cooled, diluted with 30 ml. of water, the crystals are filtered with suction, washed with 15 ml. of water and recrystallised from methanol. 1.2 grams of 2,6 - dihydroxybenzoic-acid-4'-chloranilide is obtained, melting at 223–225° C.

Example 16.—2,6-dihydroxybenzoic-acid-4'-chloranilide 2,6-dimethoxybenzoic-acid-4'-chloranilide can also be obtained according to the following method: 1.5 grams of 2,6-dimethoxybenzoic acid and 1.4 grams of 4-chlorophenylisothiocyanate are jointly heated in 8 ml. of 1,2-dichlorobenzene for 4 hours to 160° C. The hot solution is filtered, evaporated in vacuo, the residue of trituration is filtered, evaporated in vacuo, the residue of trituration is filtered with 15 ml. of N=NaOH, the solid product is filtered with suction, washed with 10 ml. of water and recrystallised from methanol. Yield: 0.8 gram, melting point: 210–211° C. The methoxy group is separated as described in Example 15(b).

We claim:

1. A gamma-resorcyl anilide selected from the group consisting of compounds having the formula

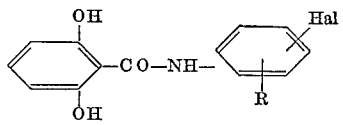

wherein Hal represents a halogen atom and R represents hydrogen, a halogen atom or lower alkyl.

2. A compound as defined in claim 1 wherin R represents hydrogen.

3. A compound as defined in claim 1 wherein Hal is halogen in 4-position and R represents hydrogen.

4. 2,6-dihydroxybenzoic-acid-4'-bromo-anilide.
5. 2,6-dihydroxy-benzoic-acid-4'-chloro-anilide.
6. 2,6-dihydroxy-benzoic-acid-3'-chloro-anilide.
7. 2,6-dihydroxy-benzoic-acid-2,4-dichloro-anilide.
8. 2,6 - dihydroxy - benzoic - acid - 2 - methyl - 4-chloro-anilide.

References Cited

UNITED STATES PATENTS 3,027,301  3/1962  Freedman et al. _____ 167—65

HENRY R. JILES, *Primary Examiner.*

H. I. MOATZ, *Assistant Examiner.*

U.S. Cl. X.R.

260—340.2, 453, 454, 473, 935; 424—230